(12) United States Patent
Ishikawa

(10) Patent No.: US 7,532,975 B2
(45) Date of Patent: May 12, 2009

(54) IMAGING APPARATUS FOR VEHICLES

(75) Inventor: Akihito Ishikawa, Chita-gun (JP)

(73) Assignee: Denso Corporation, Kariya (JP)

( * ) Notice: Subject to any disclaimer, the term of this patent is extended or adjusted under 35 U.S.C. 154(b) by 179 days.

(21) Appl. No.: 11/091,573

(22) Filed: Mar. 29, 2005

(65) Prior Publication Data

US 2005/0222753 A1 Oct. 6, 2005

(30) Foreign Application Priority Data

Mar. 31, 2004 (JP) .............................. 2004-106194
Feb. 1, 2005 (JP) .............................. 2005-025147

(51) Int. Cl.
H04N 7/18 (2006.01)
(52) U.S. Cl. ...................... 701/200; 345/601; 708/235; 382/291; 382/103; 382/104; 348/148; 348/119; 348/143
(58) Field of Classification Search ................. 348/148, 348/42, 119, 143, 150; 701/35, 28, 200; 382/291, 103, 104, 224; 345/601; 708/235; 342/104, 107, 109; 340/902, 435, 466, 465, 340/988; 180/170; H04N 7/18
See application file for complete search history.

(56) References Cited

U.S. PATENT DOCUMENTS

| | | | | |
|---|---|---|---|---|
| 5,699,057 A * | 12/1997 | Ikeda et al. | .................. | 340/937 |
| 6,535,242 B1 * | 3/2003 | Strumolo et al. | ............ | 348/148 |
| 6,734,787 B2 * | 5/2004 | Ikeda | ...................... | 340/425.5 |
| 6,958,770 B2 * | 10/2005 | Okada et al. | ................. | 349/149 |
| 7,171,027 B2 * | 1/2007 | Satoh | .......................... | 382/104 |
| 2002/0191078 A1 * | 12/2002 | Okamoto et al. | ............ | 348/148 |
| 2003/0080877 A1 * | 5/2003 | Takagi et al. | ............. | 340/932.2 |
| 2003/0090570 A1 * | 5/2003 | Takagi et al. | ................. | 348/148 |
| 2003/0109980 A1 * | 6/2003 | Kojima et al. | ................. | 701/96 |
| 2003/0165255 A1 * | 9/2003 | Yanagawa et al. | ........... | 382/104 |
| 2003/0179293 A1 * | 9/2003 | Oizumi | ....................... | 348/148 |
| 2003/0214576 A1 * | 11/2003 | Koga | ........................... | 348/47 |
| 2004/0078298 A1 * | 4/2004 | Fusama | ....................... | 705/27 |
| 2004/0085447 A1 * | 5/2004 | Katta et al. | .................. | 348/143 |
| 2004/0160635 A1 * | 8/2004 | Ikeda et al. | ................. | 358/1.15 |
| 2004/0184638 A1 * | 9/2004 | Nobori et al. | ............... | 382/104 |
| 2004/0210364 A1 * | 10/2004 | Kudo | .......................... | 701/36 |
| 2004/0247157 A1 * | 12/2004 | Lages et al. | ................. | 382/103 |
| 2004/0254720 A1 * | 12/2004 | Tanaka et al. | ............... | 701/200 |
| 2004/0267420 A1 * | 12/2004 | Tanaka et al. | ................. | 701/36 |

(Continued)

FOREIGN PATENT DOCUMENTS

JP A-8-293098 11/1996

(Continued)

Primary Examiner—Tuan C To
(74) Attorney, Agent, or Firm—Posz Law Group, PLC

(57) ABSTRACT

A vehicle is provided with a plurality of imaging cameras for imaging the front left side, front right side, rear left side, rear right side and rear side. Imaging conditions such as a position where the imaging is scheduled, imaging camera used for the imaging, vehicle traveling direction, shift position of a transmission and vehicle speed are registered in an external memory. When the present position of the vehicle detected by a position detector is at or close to the position where the imaging is scheduled and when the imaging conditions are satisfied, the external circumstances of the vehicle are imaged by the specified imaging camera and are displayed on the display unit in the vehicle.

23 Claims, 14 Drawing Sheets

U.S. PATENT DOCUMENTS

2005/0192725 A1* 9/2005 Li ............................ 701/36

FOREIGN PATENT DOCUMENTS

| JP | A-2000-207696 | 7/2000 |
| JP | A-2002-54320 | 2/2002 |
| JP | A-2003-50130 | 2/2003 |
| JP | A-2003-116125 | 4/2003 |
| JP | 2004032464 A * | 1/2004 |

* cited by examiner

FIG. 4

| CODE | POSITION | DIRECTION | SPEED | SHIFT POSITION | CAMERA |
|---|---|---|---|---|---|
| A | N** ** <br>E ** ** | XX | BELOW 7km/h | D | FRONT LEFT & RIGHT |
| B | N** ** <br>E ** ** | NOT SPECIFIED | NOT SPECIFIED | R | REAR LEFT & RIGHT |
| C | N** ** <br>E ** ** | YY | BELOW 7km/h | D | FRONT LEFT |
| | ... | ... | ... | ... | ... |
| | ... | ... | ... | ... | ... |
| | | | | | | ions. No. 2004-106194ing and displaying surrounding circumstances in a direction

IMAGING APPARATUS FOR VEHICLES

CROSS REFERENCE TO RELATED APPLICATION

This application is based on and incorporates herein by reference Japanese Patent Applications No. 2004-106194 filed on Mar. 31, 2004 and No. 2005-025147 filed on Feb. 1, 2005.

FIELD OF THE INVENTION

This invention relates to an imaging apparatus for vehicles having a plurality of imaging devices for imaging external circumstances surrounding the vehicle.

BACKGROUND OF THE INVENTION

JP 2002-54320A proposes an imaging apparatus as a parking assisting apparatus, which assists visual recognition of a driver at the time of parking or at the time of turning to the right or left by imaging the external circumstances surrounding the vehicle by using imaging cameras. According to this apparatus, the surface of the ceiling of a garage is provided with an imaging camera for imaging the back of the garage and another imaging camera for imaging the entrance/exit of the garage. The images taken by the imaging cameras are transmitted to a display unit mounted in a vehicle through a communication unit. Either one of the images is displayed on the display unit depending upon the shift position of the transmission of the vehicle.

Further, JP 2003-50130A proposes another imaging apparatus, which is not for parking assisting or driving assisting. According to this imaging apparatus, a position where the imaging is scheduled is pre-stored in a memory, and an imaging camera is turned to a certain direction to image the surrounding scenery when the vehicle arrives near the scheduled position. The imaged scenery is stored in an image memory, so that it is displayed on a display unit when the vehicle moves to a safe place.

The parking assisting apparatus in JP 2002-54320A operates only when the vehicle enter the garage or leaves the garage, and cannot be used for making sure the safety when traveling on a public road.

The imaging apparatus in JP 2003-50130A, too, is not capable of automatically determining a direction in which the driver wishes to make sure the safety in traveling on a public road, or of imaging the above direction or of displaying the above direction on a display unit.

For example, at an intersection where the visibility is poor such as in a residential area where many of the roads are one-way traffic roads, a direction in which the driver wishes to make sure the safety may differ depending upon from which direction the vehicle is entering the intersection. In this case, the above imaging apparatuses are not capable of determining the direction in which the driver wishes to see, or of imaging the direction or of displaying the imaged direction.

Further, in a particular situation where the vehicle travels onto a public road leaving the garage reverse, the above apparatuses are not capable of directing the imaging camera to the direction in which the driver is paying attention by determining the above situation to display the image on the display unit.

SUMMARY OF THE INVENTION

It is therefore an object of the present invention to provide an imaging apparatus for a vehicle, which is capable of imaging and displaying surrounding circumstances in a direction which a driver wishes to see at a position where imaging is scheduled.

An imaging apparatus for a vehicle has a plurality of imaging devices, in such a manner that the imaging direction can be differed depending upon the imaging devices. A driver stores in a memory a position where the imaging is scheduled and to store the imaging device in a direction in which the imaging is to be effected at the position where the imaging is scheduled among the plurality of imaging devices.

When the vehicle approaches the position where the imaging is scheduled or approaches close thereto, the specified imaging device images the external circumstances of the vehicle. In this case, the direction imaged by the imaging device is in agreement with a direction in which the driver wishes to see at the position where the imaging is scheduled. Therefore, a display device displays the image in a direction in which the driver wishes to see.

Preferably, the plurality of imaging devices comprise five imaging cameras for imaging the front right, front left, rear, rear right and rear left of the vehicle. Therefore, the external circumstances can be imaged in a direction in which the driver wishes to see when he travels forward to enter into an intersection or when he travels reverse to get onto a public road.

Further, the imaging apparatus stores the imaging conditions at the position where the imaging is scheduled and permits the imaging device to start imaging at the position where the imaging is scheduled on condition that the imaging conditions are satisfied. In this case, at least one of the vehicle speed, the traveling direction or the shift position of the transmission is specified as the imaging condition.

Upon setting the imaging conditions, when the vehicle approaches the position where the imaging is scheduled or approaches close thereto, nothing is imaged by the imaging device when nothing needs be imaged unlike the case of unconditionally effecting the imaging. For example, when imaging both the right and left side directions at the rear of the vehicle that is reversely leaving the garage to get onto the public road, the imaging condition may be so set as to start the imaging when the shift position is the reverse. Therefore, when the driver reversely gets onto the public road, both the right and left sides at the rear of the vehicle are imaged by the imaging devices and the images are displayed on the display device.

However, if the driver happens to drives back the vehicle into the garage, the driver drives the vehicle forward to leave the garage to get onto the public road. Therefore, the driver makes sure the safety on the right and left sides of the public road relying directly upon his own eyes without the display. In this case, both the right and left sides at the rear of the vehicle need not be imaged by the imaging devices.

Preferably, the data related to a dangerous zone are obtained from a map, and the imaging device is caused to effect the imaging based thereupon. Therefore, even when the driver travels the road which includes dangerous zones for the first time, he is assisted for conducting safe driving.

Further, when a storing operation is executed for selecting the imaging devices, the present position that is detected is stored in the memory as the position where the imaging is scheduled and the imaging device that is selected is stored in the memory as the imaging device to be used at the position where the imaging is scheduled. Besides, at least any one of the vehicle speed, the traveling direction and the shift position of the transmission at the time of the registration operation, is stored in the memory as an imaging condition. Thus, the position imaged by the imaging device which the driver wishes to see can be stored in the memory unit while the vehicle is traveling.

Further, when a route up to a destination is set or when an area is set, the communication is effected with an information center that have data related to recommended points of imaging, the imaging recommendation points on the route or in the area that is set is downloaded, and the memory stores the imaging recommendation points as the positions where the imaging is scheduled.

In this case, the imaging recommendation points may be downloaded from the memory storing the data related to the imaging recommendation points instead of effecting the communication with the information center. Thus, even without really driving the vehicle, it is made possible to register the position where the imaging is scheduled along the route which the driver is going to travel or the position where the imaging is scheduled in the area as desired by the driver.

Further, this invention measures a distance from the vehicle to an obstacle body existing by the road. When the distance is smaller than a predetermined value, the detected point is stored in the memory as a position where the imaging is scheduled. Thus, the body is automatically detected and the position thereof is registered as a position where the imaging is scheduled when the obstacle body is standing by the road hindering the visibility of the intersection or when it is probable that the vehicle comes too close to hit the body.

BRIEF DESCRIPTION OF THE DRAWINGS

The above and other objects, features and advantages of the present invention will become more apparent from the following detailed description made with reference to the accompanying drawings. In the drawings:

FIG. 4 is a table illustrating contents stored in an external memory;

DETAILED DESCRIPTION OF THE PREFERRED EMBODIMENTS

First Embodiment

The first embodiment of the present invention is a car navigation unit sown in FIGS. 1 to 8.

Figure 5:
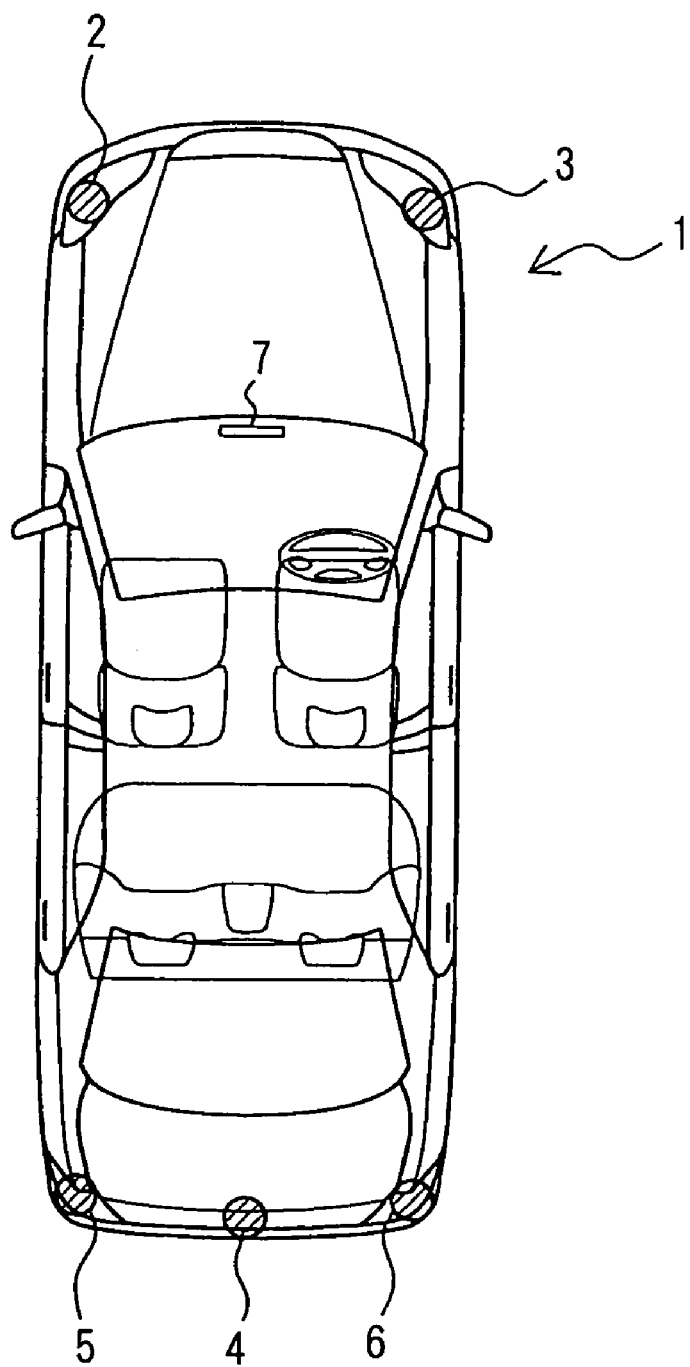
FIG. 5 is a plan view illustrating positions where imaging cameras are mounted on a vehicle.

Referring first to FIG. 5, a vehicle 1 is provided with a total of five imaging cameras 2. The five imaging cameras 2 to 6 are positioned at both the front right and front left sides of the vehicle 1, at the rear center, and at both the rear right and rear left sides. The imaging camera 2 (front left imaging camera) at the front left side images the front left side of the vehicle 1. The imaging camera (front right imaging camera) 3 at the front right side images the front right side of the vehicle 1. The imaging camera (rear imaging camera) 4 at the rear center images the rear side of the vehicle 1. The imaging camera (rear left imaging camera) 5 at the rear left side images the rear left side of the vehicle 1, and the imaging camera (rear right imaging camera) at the rear right side 6 images the rear right side of the vehicle 1. The imaging directions of the imaging cameras 2 to 6 are fixed.

The images captured through the imaging cameras 2 to 6 are displayed on a display unit 7 which is installed at a position where it can be easily watched from the driver's seat, e.g., at a deviated position in front of the driver's seat. The display unit 7 is that of a car navigation unit 8 shown in FIG. 1.

The car navigation unit 8 is constructed by connecting the display unit 7, a position detector 10, a map data storage unit 11, a group of operation switches 12, a voice output unit 13, a remote control sensor 15 for detecting signals from a remote control terminal 14, an external memory 16 and a communication unit 17 for a control circuit 9 which is for centrally controlling the whole car navigation unit 8.

The control circuit 9 is constructed with a microcomputer and includes a CPU, a ROM, a RAM and an I/O interface in the known manner. The ROM stores programs for navigation and for displaying images, and the RAM temporarily stores the processing data when a control program is executed and the map data obtained from the map data storage unit 11.

The position detector 10 is constructed with a terrestrial magnetism sensor 18 for detecting an absolute azimuth, a gyroscope 19 for detecting a yawing angular velocity (yawing rate), a vehicle speed sensor 20 for detecting the vehicle speed, and a GPS receiver 21 for receiving signals from artificial satellites for GPS, and operates to calculate the present position data (longitude and latitude data) of the vehicle 1.

In order to detect the position, the control circuit 9 calculates a distance that is traveled by the vehicle 1 by integrating the vehicle speed detected by the vehicle speed sensor 20. In the position detector 10, the devices 18 to 21 contain detection errors of different natures. Therefore, the position detector 10 operates to detect the position maintaining a high precision while interpolating the detection errors. However, if the present position can be calculated maintaining the required detection precision, those devices 18 to 21 need not be all be provided.

The map data storage unit 11 is a data storage medium of a large capacity such as CR-ROM or DVD-DRM, and a reader for reading the map data from the data storage medium. As the data storage medium, a hard disk, a magneto-optic disk or a memory card of a large capacity may be used. The map data stored in the data storage medium include map data and facility data.

The display unit 7 is constructed by a color liquid crystal display (display screen) for displaying a map. The group of operation switches 12 is constructed with mechanical switches 22 arranged surrounding the display unit 7, or a touch panel 23 formed on the color liquid crystal display of the display unit 7, and operates to input operation inputs such as various data and setting items to the control circuit 9. The remote control terminal 14 is provided as an operation device like the group of operation switches 12. Upon receiving operation inputs from the remote control terminal 14, the remote control sensor 15 transmits them to the control circuit 9. The voice output unit 13 includes a voice-synthesizing circuit, an amplifier and a speaker, and generates any voice output corresponding to the voice data from the control circuit 2.

The external memory 16 includes a RAM or a hard disk, and stores a position where the imaging is scheduled. The communication unit 17 may be a cell phone module, is connected to an information center 25 through a communication network 24 such as a cell phone network and an internet, and obtains information related to dangerous zones from the information center 25. Based upon the data related to the dangerous zone, that are obtained, the control circuit 9 alarms the driver by sound and image when the vehicle 1 approaches the dangerous zone.

The control circuit 9 is provided with known assisting functions such as a route calculation function (route searching function) in addition to executing basic functions of a map-matching processing for positioning the present position on the map. When point data are input such as of a destination or a passing place through the group of operation switches 12 or the remote control terminal 14, the control circuit 9 executes the operation for searching the route from the present position to the destination based upon the point data by using, for example, the Dijkstra method and displaying the guide route based on the results of searching the route on the map screen, and a route guide function for effecting guide operations by voice from the voice output unit 13 or by display on the display unit 7 based on the guide route obtained by the above function, The imaging cameras 2 to 6 are connected to the control circuit 9 via the image processing unit 26. The image signals from the imaging cameras 2 to 6 are fed to the control circuit 9 after having been processed through the image processing unit 26. Based on the image data from the image processing unit 26, the control circuit 9 displays on the display unit 7 the image signals obtained through the cameras 2 to 6. When the images captured through the plurality of imaging cameras are to be displayed, the control circuit 9 divides the screen of the display unit 7 into a plurality of sections, so that the images captured through the plurality of imaging cameras 2 to 6 can be simultaneously displayed.

Further, the control circuit 9 of the car navigation unit 8 is connected to a LAN in the vehicle through a LAN interface 27. To the LAN in the vehicle 1, a shift position detector 28 for detecting the shift position of the transmission is connected. The control circuit 9 obtains a detection signal from the shift position detector 28 through the LAN in the vehicle to detect the shift position of the transmission.

In this embodiment, the external memory 16 stores the position where the imaging is scheduled and the imaging cameras specified depending upon the directions which are desired to be imaged at the position where the imaging is scheduled among the five imaging cameras 2 to 6. When the vehicle 1 approaches the position where the imaging is scheduled or approaches close thereto, the specified camera images the external circumstances of the vehicle 1 and displays them on the display unit 7.

For this purpose, the position where the imaging is scheduled and the imaging cameras used for imaging must be registered (stored) in the external memory 16 in advance. The registration to the external memory 16 can be executed by operating the group of operation switches 12 or the remote control terminal 14 to place the car navigation unit 8 in a mode for setting a position where the imaging is scheduled. When a mode for setting the position where the imaging is scheduled is selected, the control circuit 9 operates as imaging control device in the following manner as shown in a flowchart of FIG. 2.

When the above mode is selected, the control circuit 9 displays on the display unit 7 a menu for inputting a position where the imaging is scheduled (step S1). The menu for inputting the position where the imaging is scheduled is for selecting a method of inputting the position where the imaging is scheduled. The method of inputting the position where the imaging is scheduled will be to display a longitude, a latitude, a facility name, an address, a telephone number and a point on a map.

When the user operates the group of operation switches 12 or the remote control terminal 14 and selects the latitude and the longitude to input the position where the imaging is scheduled, the position corresponding to the latitude and the longitude that are input, is set as the position where the imaging is scheduled. When a facility name is selected, a position corresponding to the facility name that is input is set as a position where the imaging is scheduled. When a telephone number is selected, a position corresponding to the telephone number is set as a position where the imaging is scheduled. When an address is selected, a point corresponding to the address is set as a position where the imaging is scheduled. Further, when a point on a map is selected, a point selected by moving the cursor on the map displayed on the display unit 7 is set as a position where the imaging is scheduled.

When the position where the imaging is scheduled is input (YES at step S2), the control circuit 9 displays a menu for inputting the imaging conditions on the display unit 7 (step S3). The menu for inputting the imaging conditions is for setting the conditions for starting the imaging when the vehicle 1 approaches the position where the imaging is scheduled or has approaches close thereto. The items to be set as the imaging conditions include a traveling speed, a traveling direction and a shift position of the transmission.

In this embodiment, the imaging starts when a preset condition is satisfied among the above items of conditions based on a prerequisite that the vehicle 1 enters within a circle of a radius of 50 meters with the position where the imaging is scheduled as a center. The area of the radius of 50 meters with the position where the imaging is scheduled as a center is called the position where the imaging is scheduled.

Among the above items of conditions, the traveling speed is for setting the vehicle speed for starting the imaging and can be set to be, for example, not faster than 7 km per hour. The traveling direction stands for a direction in which the vehicle enter the position where the imaging is scheduled. When the traveling direction is set to be, for example, the south, the imaging starts when the vehicle 1 enter the position where the imaging is scheduled from the south. The shift position of the transmission stands for the shift position of the transmission of when the imaging is going to be started. When the shift position is set to be the reverse, the imaging starts when the vehicle has entered the position where the imaging is scheduled with the transmission being selected to be the reverse state.

When the input ends on the menu for inputting the imaging conditions (YES at step S4), the control circuit 9 displays a menu for specifying the imaging cameras on the display unit 7 (step S5). The menu for specifying the imaging cameras is for selecting the imaging cameras used for imaging the external circumstances of the vehicle 1 at the position where the imaging is scheduled. The front right imaging camera 3 is specified when it is desired to image the front right side of the vehicle 1 at the position where the imaging is scheduled. Here, a plurality of imaging cameras can be specified. When, for example, it is desired to image both the front right and front left sides of the vehicle 1 at the position where the imaging is scheduled, both the front left imaging camera 2 and the front right imaging camera 3 are specified.

After the imaging cameras are specified on the menu for specifying the imaging cameras (YES at step S6), the control circuit 9 registers the position where the imaging is scheduled, the imaging start conditions and the imaging cameras to be used that are input through the above menus to the external memory 16 (step S7). FIG. 4 is a diagram schematically illustrating the contents stored in the external memory 16. The position where the imaging is scheduled is registered as the latitude and the longitude irrespective of the inputting method.

Here, the position where the imaging is scheduled, the imaging starting conditions and the specified imaging cameras exemplified in FIG. 4 will now be described in detail with reference to FIGS. 6 to 8.

(1) Position A where the Imaging is Scheduled.

Figure 6:
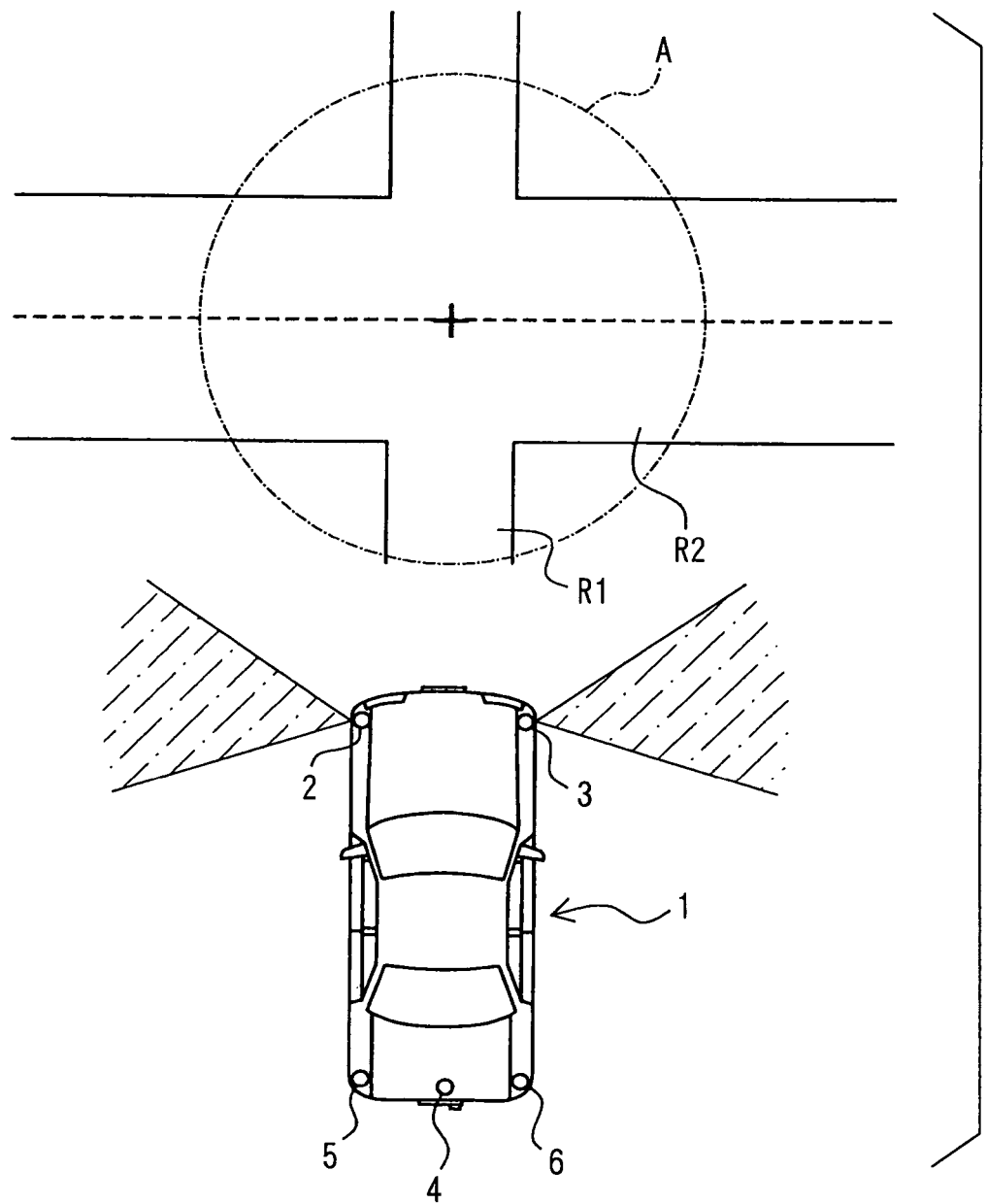
FIG. 6 is a plan view illustrating circumstances at a position A where imaging is scheduled.

Referring to FIG. 6, the position A where the imaging is scheduled is an intersection where a narrow road R1 intersects a wide road R2. The user is now driving the vehicle 1 forward on the narrow road R1 in a XX-direction (upward in FIG. 6) to come across the wide road R2. In this case, the visibility is poor in the right-and-left direction, and the user wishes to image the front left and front right of the vehicle 1.

In this example, the imaging starting conditions are such that the traveling direction is the XX-direction, the vehicle speed is not faster than 7 km per hour, and the shift position of the transmission is the D (drive: forward) position. The cameras used for the imaging are the front left imaging camera 2 and the front right imaging camera 3.

(2) Position B where the Imaging is Scheduled.

Figure 7:
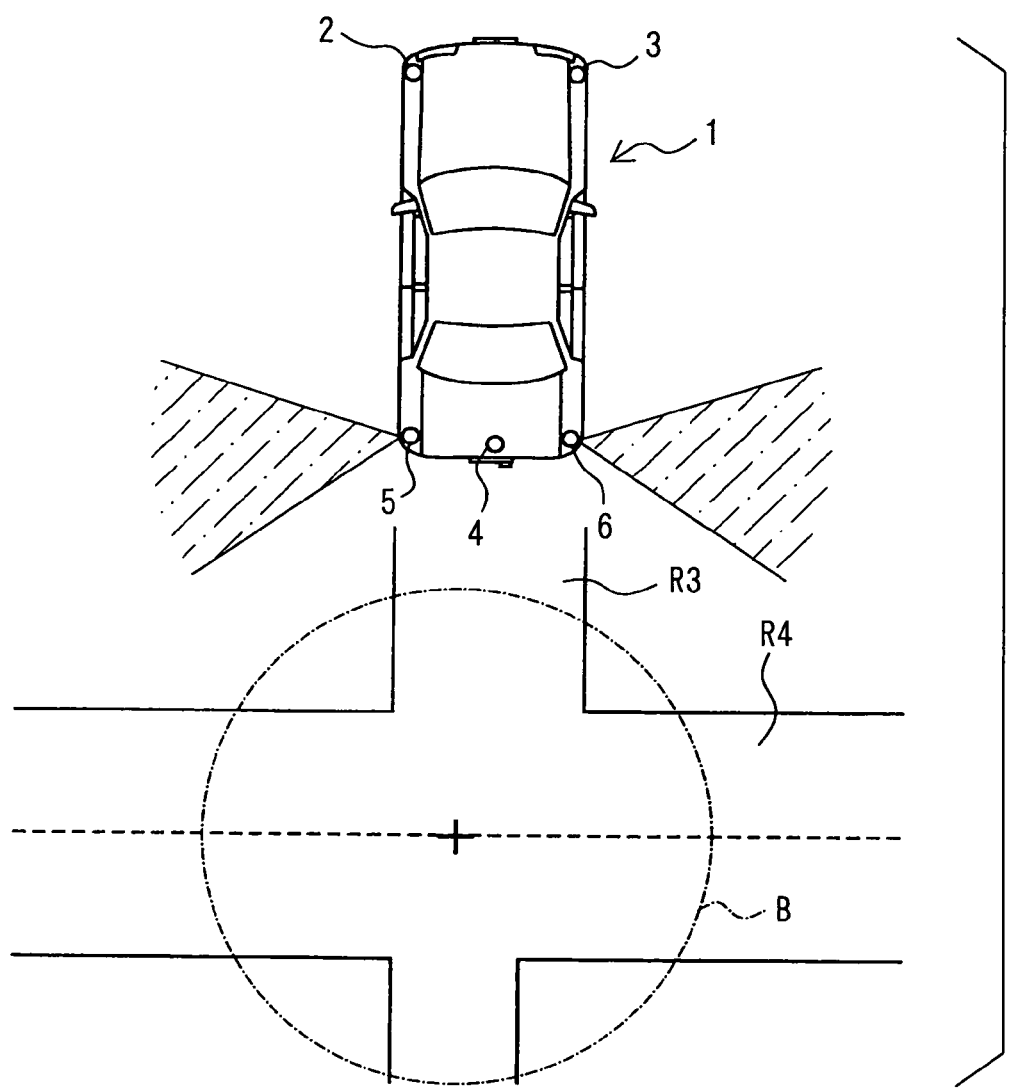
FIG. 7 is a plan view illustrating circumstances at a position B where imaging is scheduled.

FIG. 7 illustrates the position B where the imaging is scheduled. In this case, the vehicle 1 is traveling reverse on a road R3, is going to turn to the right in the figure at the intersection with a road R4, and is going to travel forward on the road R4. The vehicle 1 reversely enters the intersection. In getting onto the road R4 from the road R3, the driver wishes to image the rear left side and the rear right side of the vehicle 1.

As the imaging starting conditions, therefore, the forward direction and the traveling speed are not particularly specified, but the shift position of the transmission is set to the R (reverse) position. As the cameras for imaging, there are specified the rear left imaging camera 5 and the rear right imaging camera 6.

(3) Position C where the Imaging is Scheduled.

Figure 8:
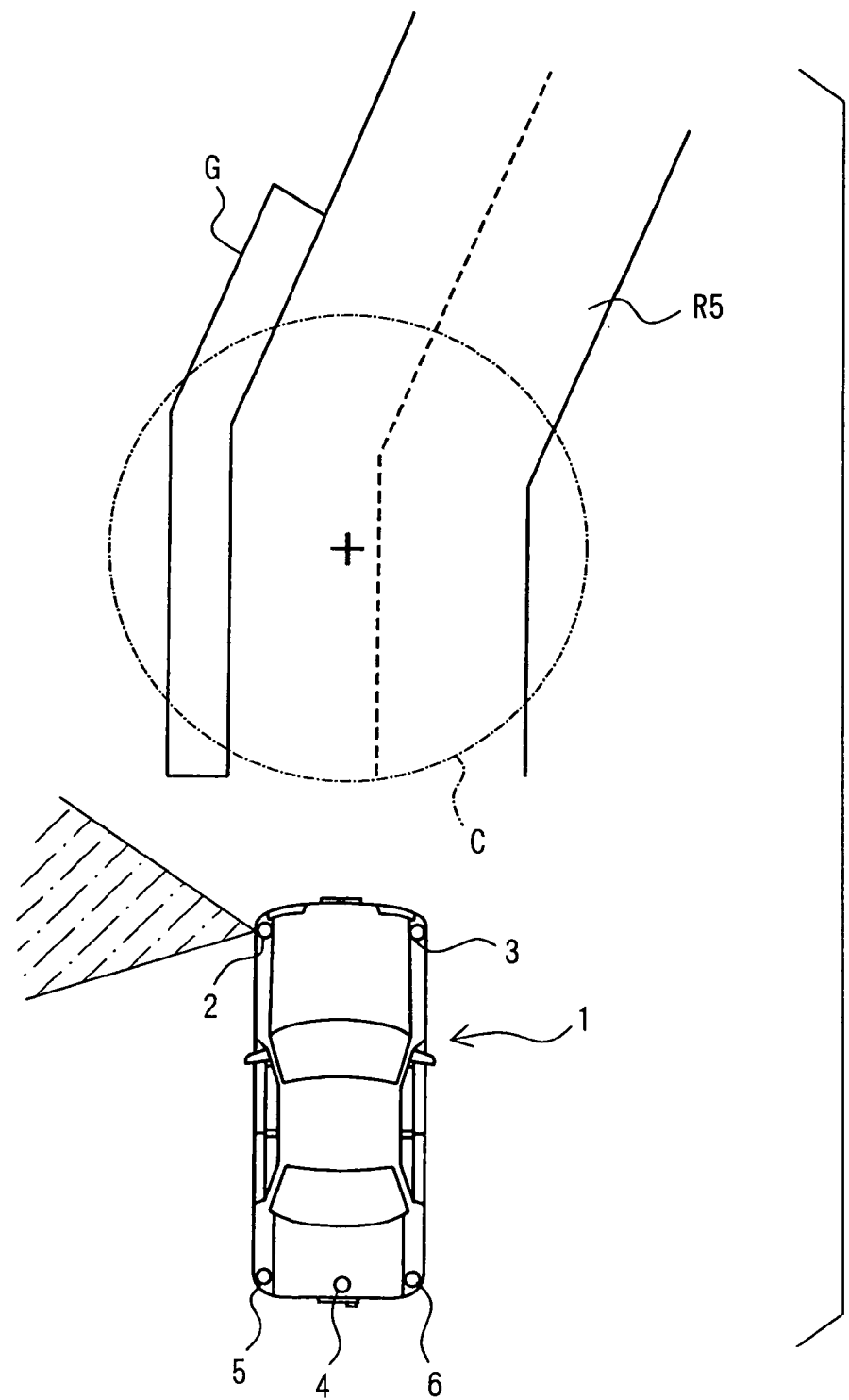
FIG. 8 is a plan view illustrating circumstances at a position C where imaging is scheduled.

Referring to FIG. 8, the position C where the imaging is scheduled is a point in such circumstances that a narrow road R5 is curving rightward from the lower side to the upper side in the figure, and a concrete-block wall G is standing on only one side of the curving road which is on the right side in the figure. The user is now going to travel through the position C where the imaging is scheduled in a YY-direction (upward in the figure), and passes through the curving portion while looking at the concrete-block wall G on the left. At the position where the imaging is scheduled, therefore, the user wishes to image the front left of the vehicle 1 so that the front part of the vehicle 1 will not hit the concrete-block wall G.

As the imaging starting conditions, therefore, the traveling direction is specified to the YY-direction and the shift position of the transmission is set to the D-position without, however, specifying the traveling speed. As the cameras for imaging, the front left imaging camera 2 is specified.

Thus, the automatic imaging mode is selected by registering the position where the imaging is scheduled and the like, and the images captured through the imaging cameras are displayed on the display unit 7 when it is detected that the vehicle 1 enter the position where the imaging is scheduled and when the imaging conditions are satisfied.

Figure 1:
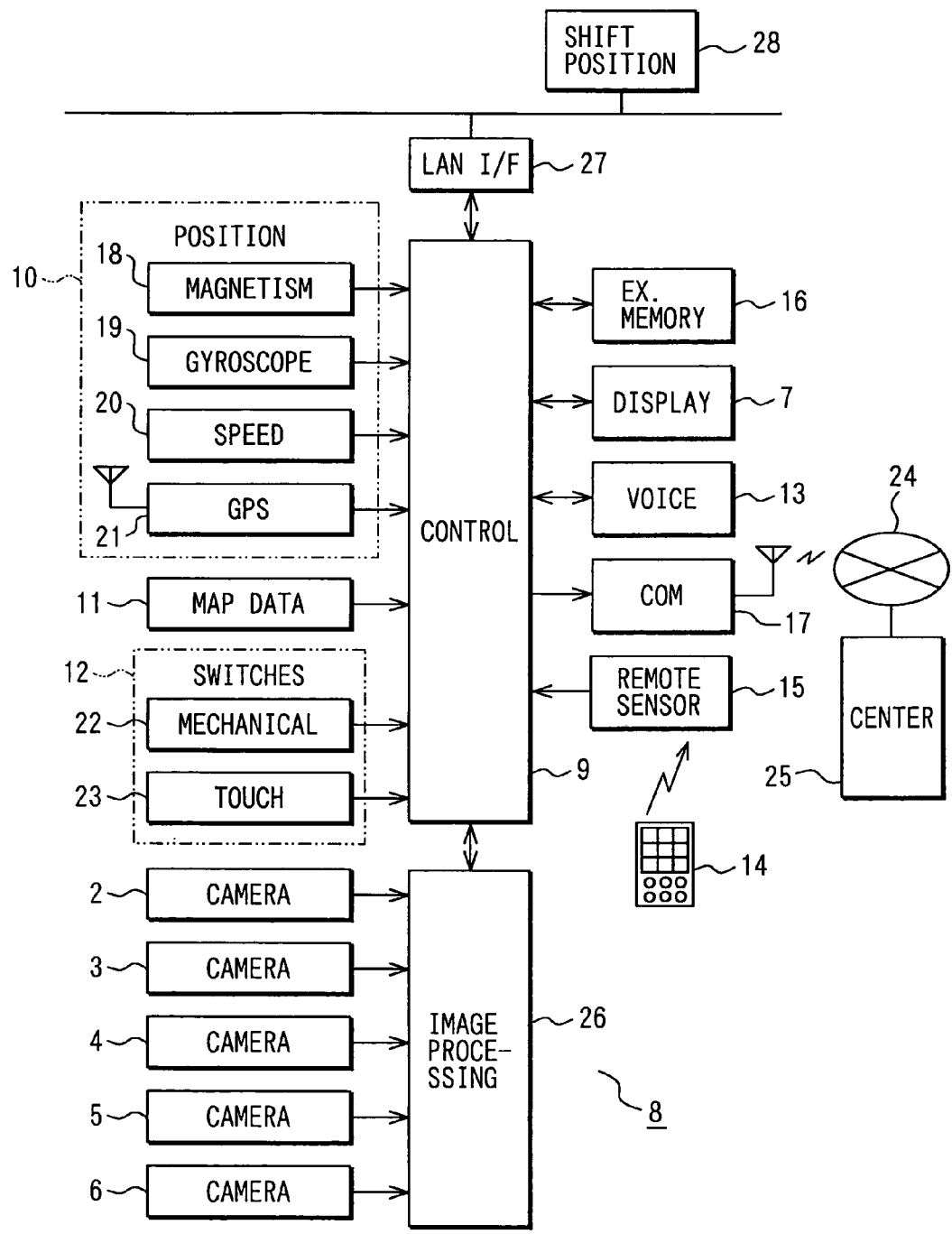
FIG. 1 is a block diagram illustrating a first embodiment of the present invention.
Figure 2:
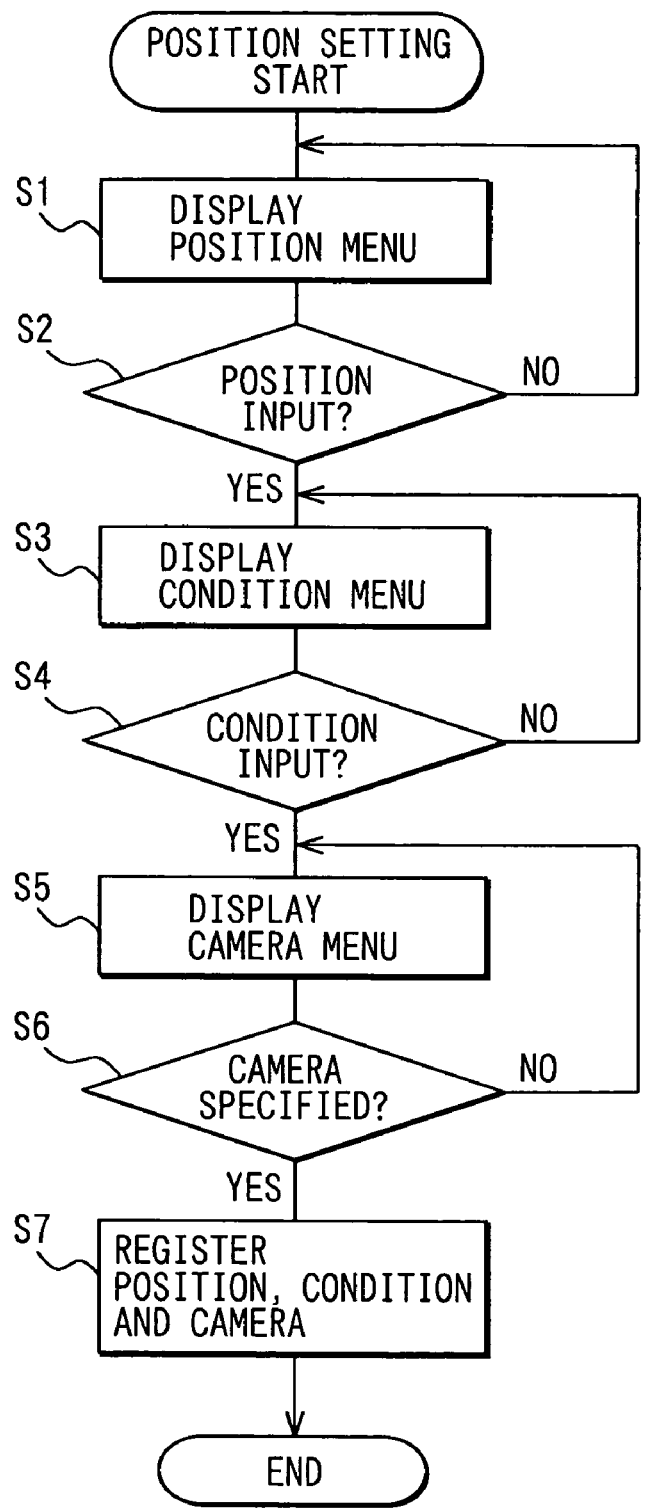
FIG. 2 is a flowchart illustrating processing for setting a position where imaging is scheduled.
Figure 3:
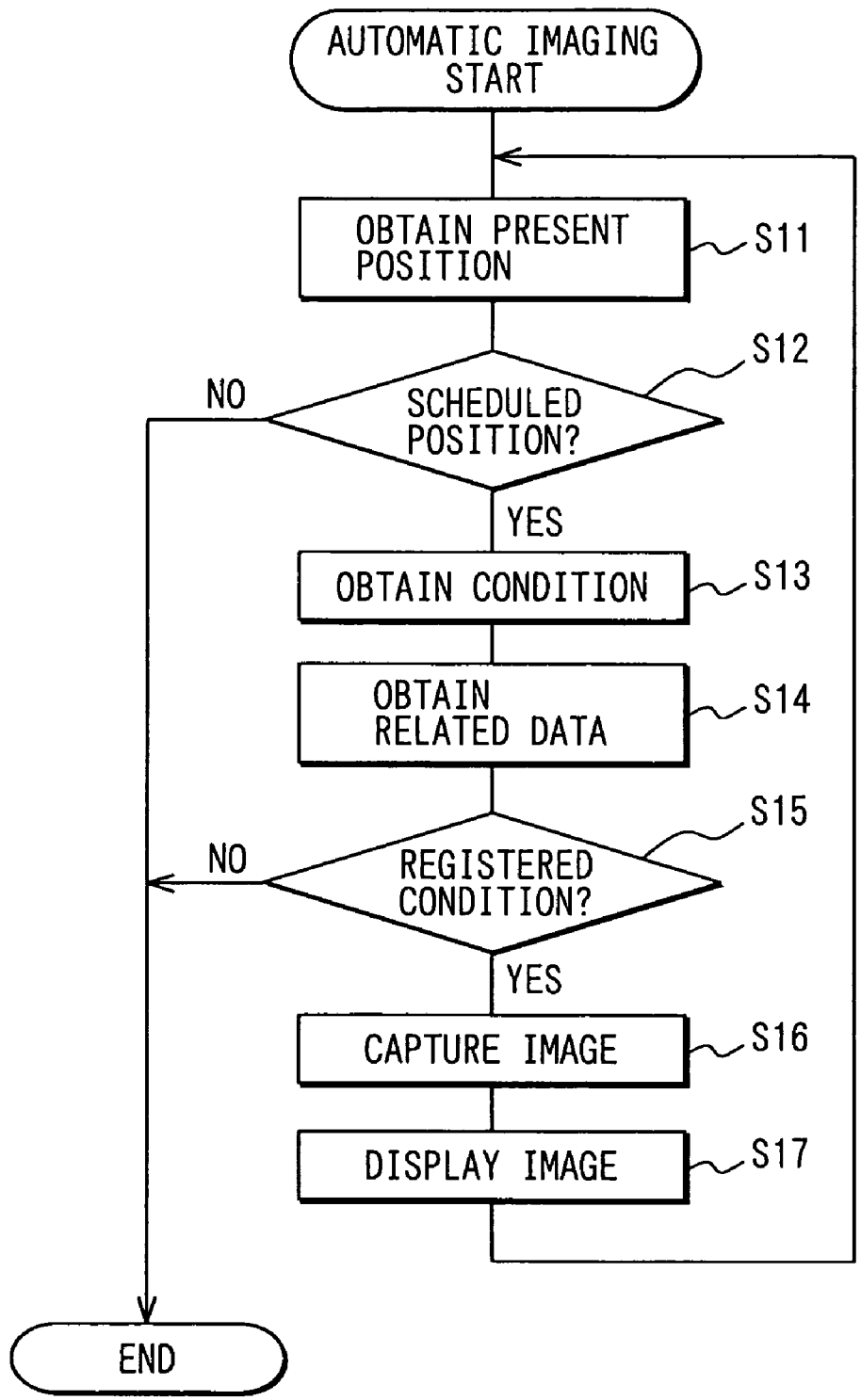
FIG. 3 is a flowchart illustrating processing for automatic imaging.

The image processing at the position where the imaging is scheduled will now be described in detail with reference to a flowchart of FIG. 3. When the automatic imaging mode is selected, the control circuit 9 detects the present position of the vehicle 1 from the position detector 10 (step S11). The control circuit 9 determines if the present position that is obtained is in the position where the imaging is scheduled that is registered in the external memory 16. When this determination is "NO", the control circuit 9 ends this routine.

When the present position is within the position where the imaging is scheduled, the control circuit 9 renders the determination "YES" at step S12 and obtains the item of the imaging condition at the position where the imaging is scheduled from the external memory 16 (step S13). The control circuit 9 obtains the data related to the item specified as the imaging condition (step S14). That is, when the traveling direction is an item of the imaging condition, the traveling direction of the vehicle 1 is detected based on a change in the present position. When the vehicle speed is an item of the imaging condition, the speed of the vehicle 1 is detected from the vehicle speed sensor 20. When the shift position of the transmission is an item of the imaging condition, the shift position is detected from the shift position detector 28.

When an item of the imaging condition is detected, the control circuit 9 determines next if the item of the imaging condition that is detected satisfies the registered condition (step S15). If the imaging condition is not satisfied, determination is rendered to be "NO" at step S15 and this routine ends. If the imaging condition is satisfied, the control circuit 9 renders the determination "YES" at step S15, causes the specified camera registered to the external memory 16 to capture the image of the external circumstances of the vehicle 1 at the position where the imaging is scheduled (step S16) and displays the image on the display unit 7 (step S17).

Thereafter, the control circuit 9 returns to step S11, continues the imaging through the imaging cameras and continues to display the images on the display unit 7 until the vehicle 1 leaves the position where the imaging is scheduled (NO at step S12) or until the item of the imaging condition deviates from the imaging conditions (NO at step S15).

The imaging using the imaging cameras will now be described with respect to the above positions A to C where the imaging is scheduled. First, when the vehicle 1 enters the position A where the imaging is scheduled, the control circuit 9 detects the traveling direction of the vehicle 1, the shift position of the transmission and the vehicle speed. The vehicle 1 travels in the XX-direction, i.e., travels toward the wide road R2 from the narrow road R1 while the transmission is held at the D-position (vehicle 1 is traveling forward) and the vehicle speed is not higher than 7 km per hour. In this case, the front left imaging camera 2 and the front right imaging camera 3 image both the front right and front left sides of the vehicle 1. The images captured through the two imaging cameras 2 and 3 are displayed as being arranged right and left (divided display) on the display unit 7.

Therefore, even when the vehicle 1 enters the position A where the imaging is scheduled, the imaging through the imaging cameras 2 and 3 is not executed when the entering direction is not the XX-direction, such as when the vehicle traveling on the wide road R2 enters the position A where the imaging is scheduled. This is because the wide road R2 has the priority, and both the front right and front left sides need not dare to be imaged. Therefore, the imaging is not unnecessarily effected by the imaging cameras 2 and 3.

Further, when the vehicle 1 enters the position B where the imaging is scheduled, the control circuit 9 detects only the shift position of the transmission. If the shift position is the R-position, both the rear right and rear left sides of the vehicle 1 are imaged by using the rear left imaging camera 5 and the rear right imaging camera 6. Therefore, the user who is going to get onto the road R4 from the road R3 while driving the vehicle 1 in reverse is allowed to drive the vehicle 1 while making sure the right and left of the road R4 relying upon the images displayed on the display unit 7.

Therefore, when the vehicle 1 travels forward to get onto the road R4 from the road R3, no imaging is executed through the two imaging cameras 5 and 6 so will not to effect such an irrational operation as displaying the right and left circumstances of the road R4 on the display unit 7 despite the right and left of the road R4 can be confirmed by the user's own eyes.

Further, when the vehicle 1 enters the position C where the imaging is scheduled in FIG. 8, the control circuit 9 detects the traveling direction, the vehicle speed and the shift position. When they satisfies the imaging conditions, the front left side of the vehicle 1 is imaged by the front left imaging camera 3, and the image is displayed on the display unit 7. Therefore, the user carries out safe driving so that the front part of the vehicle 1 will not hit the concrete-block wall G.

In this case, too, it is not probable that the vehicle 1 will hit the concrete-block wall G when it is traveling forward in a direction opposite to the YY-direction. Therefore, the front left side of the vehicle 1 is not wastefully imaged by the front left imaging camera 3. Further, the vehicle 1 may travel forward in the YY-direction at a speed of not lower than 7 km per hour maintaining a distance from the concrete-block wall G since there is no vehicle coming on. In this case, too, there is no need of imaging the front left side of the vehicle 1 by using the front left imaging camera 3. Therefore, the front left side of the vehicle 1 is not imaged by the front left imaging camera 3 since there is no probability of hitting the concrete-block wall G.

According to this embodiment, the circumstances obtained at the position where the imaging is scheduled are imaged by using the imaging cameras and are displayed on the display unit 7. Therefore, the driver is allowed to travel through, for example, an intersection where the visibility is poor while making sure the safety on the right and left sides relying upon the images displayed on the display unit 7.

Even when the vehicle 1 enters the position where the imaging is scheduled, further, the imaging is not executed by the imaging cameras unless the imaging conditions are satisfied. Therefore, unnecessary images are not displayed on the display unit 7.

Second Embodiment

Figure 9:
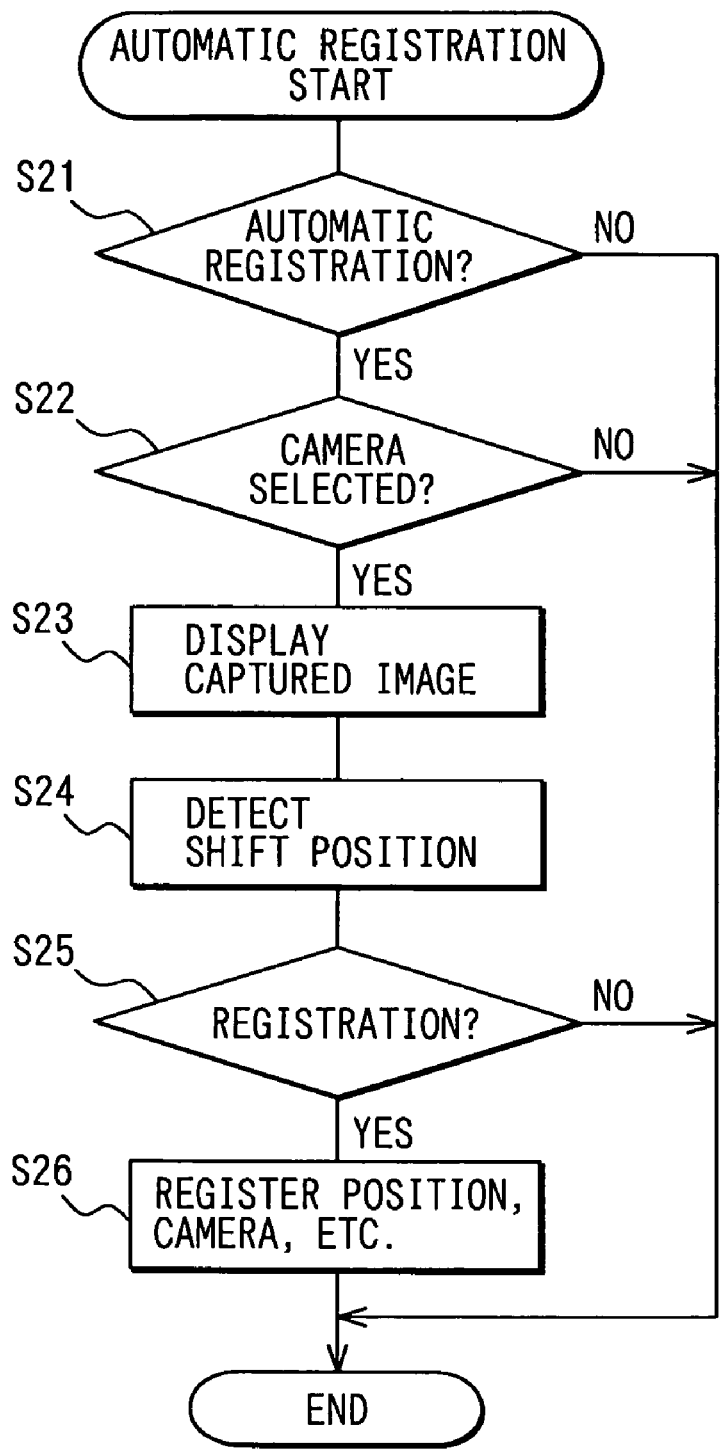
FIG. 9 is a flowchart illustrating a second embodiment of the present invention.

In the second embodiment shown in FIG. 9, the position where the imaging is scheduled is automatically registered. That is, the group of operation switches 12 or the remote control terminal 14, which is a mode setting device, is operated to set a mode for automatically registering a position where the imaging is scheduled.

The control circuit 9 renders the determination "YES" at step S21 in the routine for automatic registration, and the routine proceeds to step S22. At step S22, the control circuit 9 is placed in a standby state until the group of operation switches 12 or the remote control terminal 14 is operated.

When the vehicle reaches a point where the user wishes to image the circumstance scene while driving the vehicle, the user operates the group of operation switches 12 or the remote control terminal 14 to select an imaging camera depending upon a direction in which he wishes to image out of the plurality of imaging cameras 2 to 6. Then, the control circuit 9 renders the determination "YES" at step S22 and displays the images taken through the selected imaging cameras on the display unit 7 (step S23).

Next, the control circuit 9 obtains, from the position detector 10, the position of the vehicle at a moment when the operation is effected to select the imaging cameras, and detects the circumstances of the vehicle at a moment when the operation is effected, i.e., in this embodiment, detects the vehicle speed from the vehicle speed sensor 20, detects the traveling direction from the terrestrial magnetism sensor 18 or from the gyroscope 19, and detects the shift position of the transmission from the shift position detector 28 (step S24). The circumstances of the vehicle may comprise the traveling direction only, the shift position only or the vehicle speed only, or may comprise two data among them.

When the operation is carried out by using the group of operation switches 12 or the remote control terminal 14 to determine the registration (step S25), the control circuit 9 stores, in the external memory 16, the present position that is obtained as a position where the imaging is scheduled, the selected imaging cameras as the imaging cameras to be used at the position where the imaging is scheduled, the obtained vehicle speed, the traveling direction and the shift position as the imaging conditions (step S26), and this routine ends.

According to the second embodiment, a desired position can be selected as the position where the imaging is scheduled and can be automatically registered while really traveling on the road.

Third Embodiment

Figure 10:
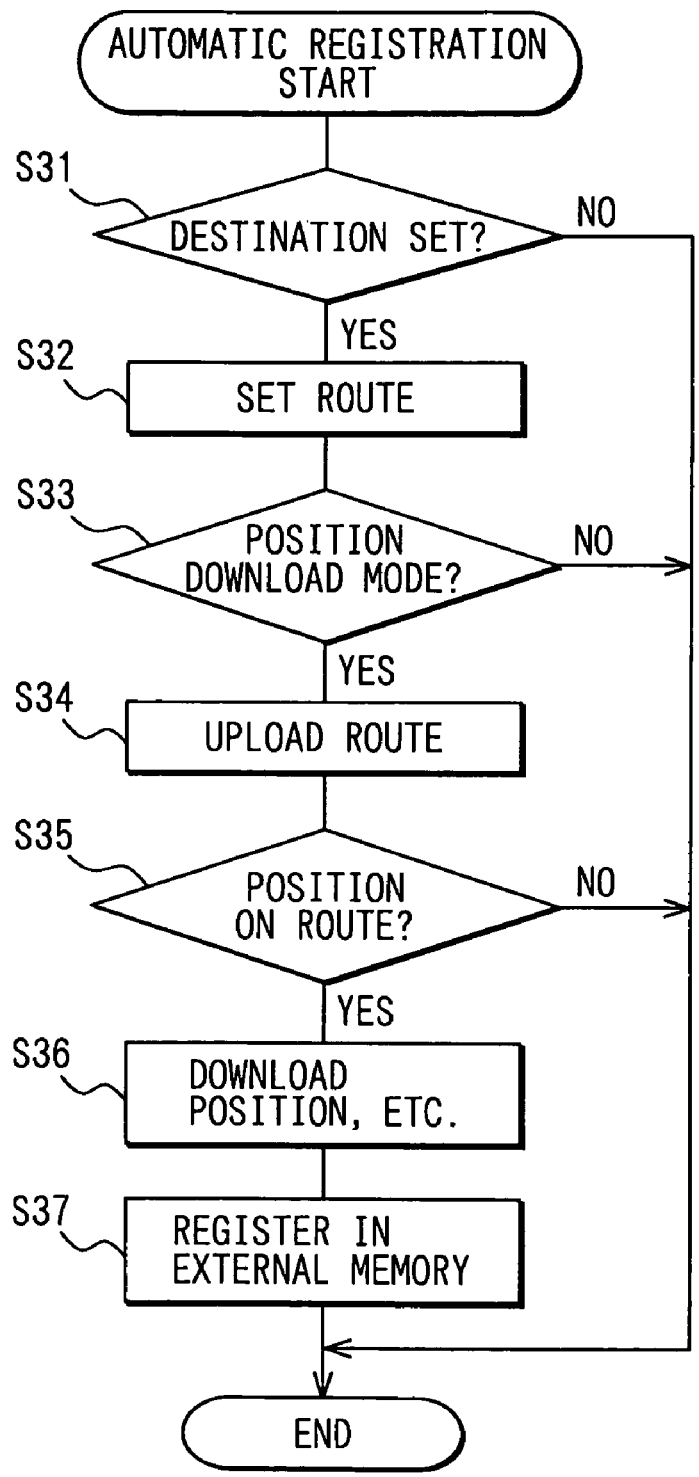
FIG. 10 is a flowchart illustrating a third embodiment of the present invention.

In the third embodiment shown in FIG. 10, when a route up to a destination is set, an imaging recommendation position on the route can be automatically registered as a position where the imaging is scheduled even without really traveling along the road.

That is, the group of operation switches 12 or the remote control terminal 14, which is a destination input device, is operated to set a destination (YES at step S31), and the control circuit 9 sets a route from the starting point (usually, the present position) to a destination (step S32). Next, the group of operation switches 12 or the remote control terminal 14, which is mode setting device, is operated to set a mode for downloading the imaging recommendation position or point (YES at step S33).

Then, the control circuit 9 uploads the route (guide route) that is set into the information center 25 through the communication unit 17 (step S34). In this embodiment, the information center 25 stores in the database thereof a point where an accident has occurred in the past as an imaging recommendation position, determines the imaging direction depending upon the vehicle of from which direction was involved in the accident, and stores it in the database. The information center 25 retrieves the database and determines if there is an image recommendation point on the guide route uploaded from the vehicle 1 (step S35).

When the imaging recommendation point exists on the guide route (YES at step S35), the imaging recommendation position and the imaging direction are downloaded onto the vehicle 1 (step S36). The imaging recommendation position and the imaging direction that are downloaded are sent to the control circuit 9 from the communication unit 17. The control circuit 9 registers the imaging recommendation position as a point where the imaging is scheduled to the external memory 16, selects imaging cameras to be used out of the plurality of imaging cameras 2 to 6 based on the imaging direction, and registers them in the external memory 16 (step S37) to end the routine.

According to this embodiment, the imaging point recommended by the information center 25 can be automatically registered as a position where the imaging is scheduled upon setting a guide route.

Fourth Embodiment

Figure 11:
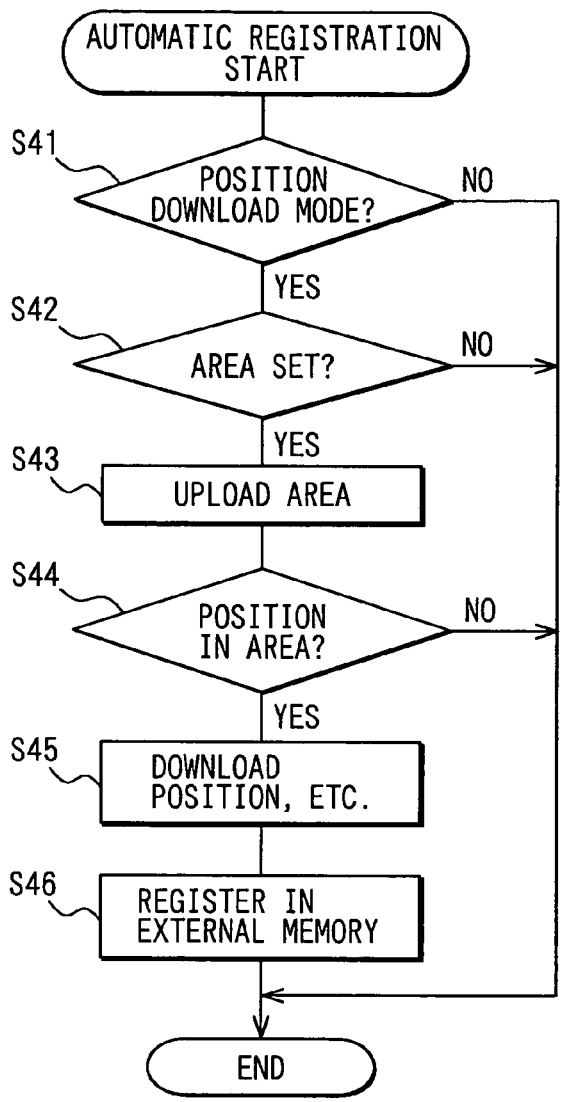
FIG. 11 is a flowchart illustrating a fourth embodiment of the present invention.

The fourth embodiment shown in FIG. 11 is similar to the third embodiment in that this embodiment makes it possible to automatically register the position where the imaging is scheduled even without really traveling on the road. Here, however, the fourth embodiment is different from the third embodiment is that, when an area is set, an imaging recommendation position in the area can be automatically registered as a position where the imaging is scheduled.

That is, the group of operation switches 12 or the remote control terminal 14, which is a mode setting device, is operated to set a mode for downloading the imaging recommendation position. Next, the group of operation switches 12 or the remote control terminal 14, which is also an area setting device, is operated to specify a desired area of a desired expansion. Then, the control circuit 9 renders the determination "YES" at step S41. At next step S42, the area specified by using the group of operation switches 12 or the remote control terminal 14 is set on the area on the map data and are uploaded to the information center 25 via the communication unit 17 (step S43).

In this embodiment, too, the information center 25 stores in the database thereof a position where an accident has occurred in the past as an imaging recommendation point, and stores the imaging direction depending upon the vehicle of from which direction was involved in the accident. The information center 25 retrieves the database and determines if there is an image recommendation position in the area uploaded from the vehicle 1 (step S44).

When the imaging recommendation point exists in the area (YES at step S44), the imaging recommendation point and the imaging direction are downloaded onto the vehicle 1 (step S45). The control circuit 9 on which the imaging recommendation position and the imaging direction are downloaded operates to register the imaging recommendation point as a position where the imaging is scheduled to the external memory 16, selects imaging cameras to be used at the imaging recommendation point out of the plurality of imaging cameras 2 to 6 based on the imaging direction, and registers them in the external memory 16 (step S46) to end the routine.

According to this embodiment, the imaging position recommended by the information center 25 can be registered as a position where the imaging is scheduled upon setting the area.

Fifth Embodiment

Figure 13:
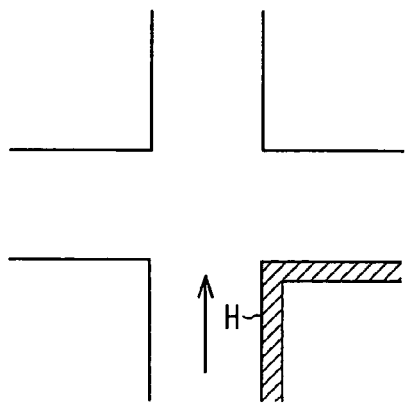
FIG. 13 is a diagram illustrating an intersection where visibility is poor.
Figure 12:
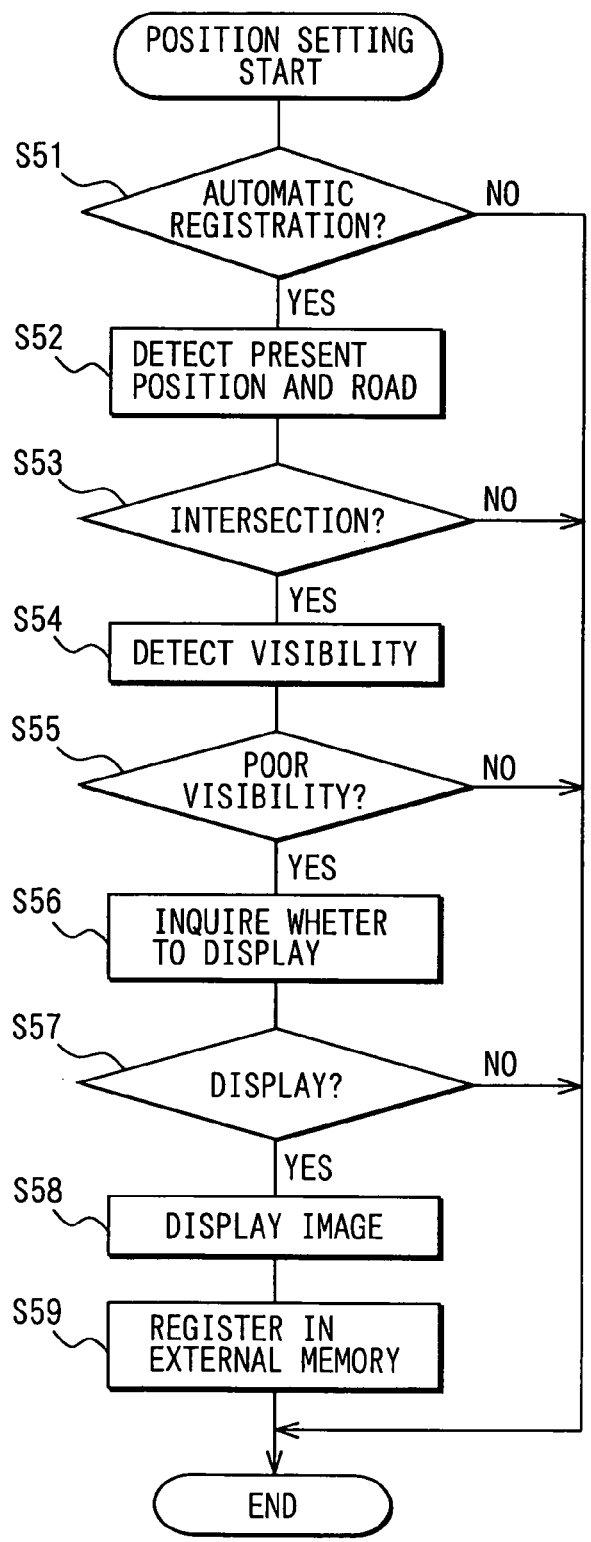
FIG. 12 is a flowchart illustrating a fifth embodiment of the present invention.

The fifth embodiment shown in FIGS. 12 and 13 is similar to the second embodiment in regard to registering the position where the imaging is scheduled while the vehicle is traveling. This fifth embodiment is different from the second embodiment in regard to registering an intersection as a position where the imaging is scheduled when a body existing by the road hinders the visibility at the intersection.

In this embodiment, the imaging cameras 2 to 6 are equipped with an automatic focusing function. The control circuit 9 is so constructed as to detect the distance up to the body on which the focal point is set concerning the images captured through the imaging cameras 2 to 6. Therefore, the imaging cameras 2 to 6 work as distance measuring devices.

In FIG. 13, the vehicle 1 is assumed to be traveling in a direction of an arrow to enter the intersection. Here, a high wall H is standing on the right side just before entering into the intersection. When entering into the intersection in the direction of the arrow, therefore, the presence of the wall H is interrupting the visibility on the right side.

In this case, the front right imaging camera 3 detects the presence of a body (wall H) in a close range before entering into the intersection, and measures the distance to the body (wall H) by the use of its automatic focusing function. When the distance to the body (wall H) is not larger than a predetermined value, the control circuit 9 so determines that the visibility is poor in the direction imaged by the imaging camera 2.

Next, the group of operation switches 12 or the remote control terminal 14, which is a mode setting device for automatically registering an intersection of poor visibility as a position where the imaging is scheduled, is operated to set a mode for automatically registering a position where the imaging is scheduled. Therefore, upon entering the execution of a flowchart of FIG. 12, the control circuit 9 renders the determination "YES" at step S51, detects the present position and detects the road on which the vehicle is now traveling from the present position and the map data (step S52).

The imaging cameras 2 to 6, on the other hand, are continuing the imaging while the vehicle 1 is traveling. When it is determined that the vehicle reaches a point of entering into the intersection from the present position and the road data of during the traveling (YES at step S53), the control circuit 9 detects the visibility at the intersection based on the imaging data obtained through the imaging cameras 2 to 6 (step S54). When the intersection is the one shown in FIG. 13, the control circuit 9 so determines that the visibility at the intersection is poor due to the body at a portion of entering into the intersection as imaged by any one of the imaging cameras 2 to 6 and due to that the distance to the body is not larger than a predetermined distance (YES at step S55).

Next, the control circuit 9 inquires if the image of the camera imaging the body that is hindering the visibility at the intersection be displayed (step S56). This inquiry is produced as voice by the voice output unit 13 or as a display on the display unit 7. In response to the inquiry, the user makes a reply of "display" by operating the group of operation switches 12 or the remote control terminal 14 (YES at step S57). The control unit 9 displays the image obtained through the imaging camera on the display unit 7 (step S58).

The control circuit 9 registers the position of the intersection and the camera imaging the body that is hindering the visibility at the intersection to the external memory 16 as a position where the imaging is scheduled and as the imaging camera to be used, and registers the vehicle speed at that moment, the traveling direction and the shift position as imaging conditions to the external memory 16 (step S59) to end the routine.

According to this embodiment, the intersection where the visibility is poor can be registered as a position where the imaging is scheduled upon detecting the body by the road.

Sixth Embodiment

Figure 14:
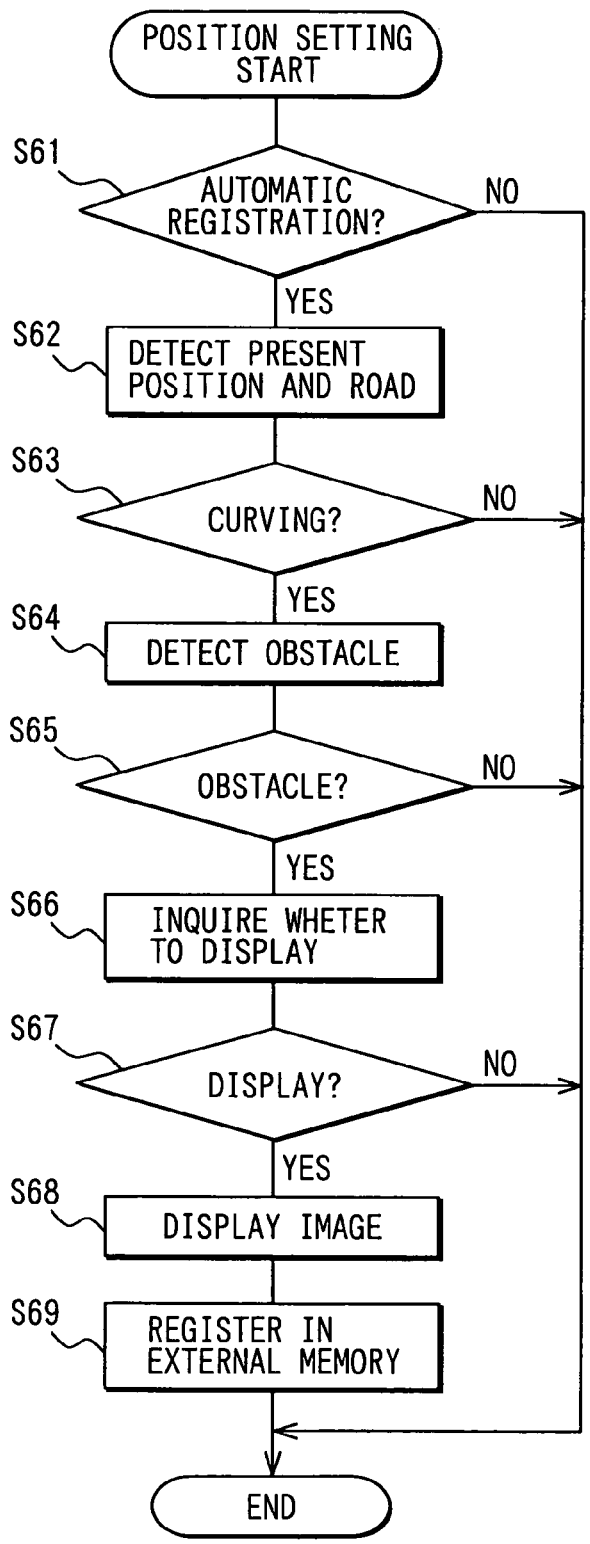
FIG. 14 is a flowchart illustrating a sixth embodiment of the present invention.

The sixth embodiment shown in FIG. 14 is different from the fifth embodiment in regard to detecting an obstacle by the road and registering the position of the obstacle as a position where the imaging is scheduled when the obstacle is creating a circumstance where the vehicle is probable to hit the obstacle.

The circumstance where the vehicle is likely to hit the obstacle by the road is imagined to be a case where as shown, for example, in FIG. 8, the concrete-block wall G is standing by a curving road and the vehicle may hit the concrete-block wall G if it comes too close thereto. In the case of FIG. 8, when the vehicle 1 approaches the side of the concrete-block wall G, the front left imaging camera 2 detects the presence of the body (concrete-block wall G) near it and measures the distance to the body (concrete-block wall G) by the use of the automatic focusing function. When the distance to the body (concrete-block wall G) is smaller than a predetermined value, the control circuit 9 so determines that an obstacle is existing nearby the road in a direction in which the camera 2 is imaging.

The group of operation switches 12 or the remote control terminal 14 is operated to set a mode for automatically registering a position where the imaging is scheduled. Therefore, upon entering the execution of a flowchart of FIG. 14, the control circuit 9 renders the determination "YES" at step S61, detects the present position, and detects a road on which the vehicle now travels from the present position and the map data (step S62).

The imaging cameras 2 to 6, on the other hand, continue the imaging while the vehicle 1 is traveling. When it is determined that the vehicle is entering a curving point from the present position and the road data of during the traveling (YES at step S63), the control circuit 9 detects the obstacle based on the imaging data obtained through the imaging cameras 2 to 6 (step S64). When there is the body in a direction imaged by any one of the cameras 2 to 6 and the distance to the body is smaller than a predetermined distance, the control circuit 9 so determines that there is an obstacle by the road (YES at step S65).

Next, the control circuit 9 inquires if the image of the camera imaging the obstacle be displayed (step S66). This inquiry is produced as voice by the voice output unit 13 or as a display on the display unit 7. In response to the inquiry, the user makes a reply of "display" by operating the group of operation switches 12 or the remote control terminal 14 (YES at step S67). The control unit 9 displays the image obtained through the imaging camera on the display unit 7 (step S68). The control circuit 9 registers the present position and the camera imaging the obstacle to the external memory 16 as a position where the imaging is scheduled and as the imaging camera to be used, and registers the vehicle speed at that moment, the traveling direction and the shift position as imaging conditions to the external memory 16 (step S69) to end the routine.

According to this embodiment, the position where there is existing an obstacle which the vehicle may hit can be registered as a position where the imaging is scheduled upon detecting the body by the road.

Seventh Embodiment

Figure 15:
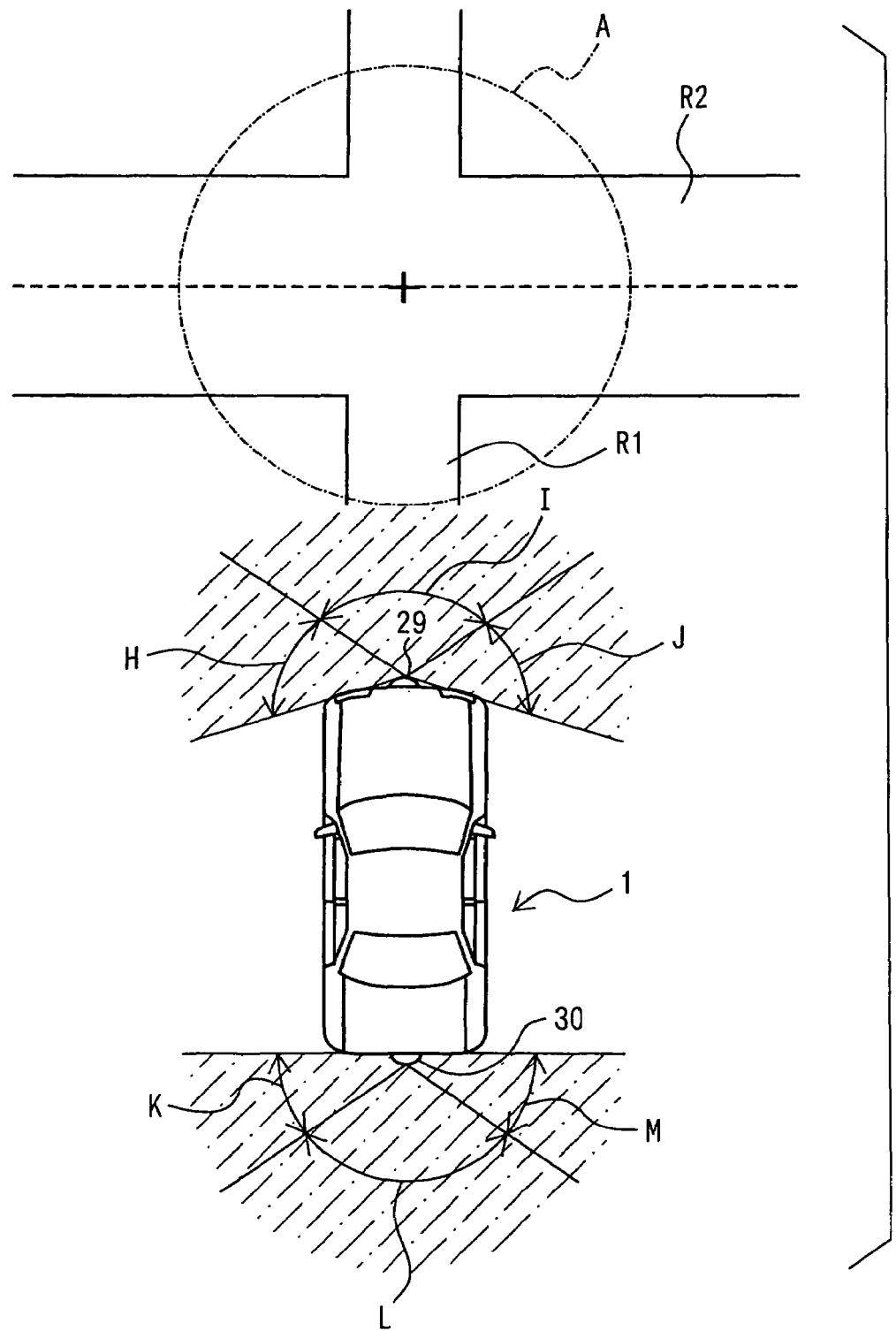
FIG. 15 is a view illustrating a seventh embodiment of the present invention.

In the seventh embodiment shown in FIG. 15, two additional cameras 29 and 30 are installed at the front center and at the rear center of the vehicle 1. The imaging cameras 29 and 30 employ fisheye lenses which are wide-angle lenses and are capable of imaging wide ranges (H, I, J) of nearly not narrower than 180 degrees of from the front left side of the vehicle 1 through the front up to the front right side thereof, and imaging wide ranges (K, L, M) of nearly not narrower than 180 degrees of from the rear left side of the vehicle 1 through the rear up to the rear right side thereof.

In this case, the imaging direction is specified to the external memory 16 instead of specifying the imaging camera that is done in the above first embodiment. The control circuit 9 divides the images captured through the imaging cameras 29 and 30 into three, i.e., right, middle and left, and displays any one or more of the images divided into three on the display unit 7 depending upon the imaging direction.

In the case of the seventh embodiment, for example, when the imaging directions are specified to be the front right side and the front left side, the control circuit 9 displays, on the display unit 7, the image in a range of the left side H and in a range of the right side J among the imaging ranges H, I and J of the front imaging camera 29 when the vehicle 1 travels onto a wide road from a narrow road.

Other Embodiments

The invention is not limited to only those embodiments described above and illustrated and may be modified in many other ways.

When the vehicle 1 enters a dangerous zone, one or more cameras may be selected from the imaging cameras 2 to 6 depending upon the content of the data related to the dangerous zone obtained from the information center 25 to image the external circumstances and to display the images on the display unit 7.

The vehicle speed sensor 20 may be a distance sensor. In this case, the distance detected by the distance sensor may be differentiated to find the vehicle speed.

The position where the imaging is scheduled may be registered not as a position but as a range by specifying the address such as a street number and a house number.

The embodiments illustrated in FIGS. 9 to 14 can be applied to the embodiment of FIG. 15 which uses two imaging cameras 29 and 30 employing fisheye lenses.

Instead of obtaining data related to the imaging recommendation point from the information center 25 via the communication unit 17, the third and fourth embodiments illustrated in FIGS. 10 and 11 may be provided with a slot for inserting a storage medium such as a memory stick, or may be provided with a connection terminal for a disk drive enabling the control circuit 9 to read the data from the storage medium such as a CD-ROM or a DVD-ROM, and the data related to the imaging recommendation point stored in the storage medium may be downloaded.

What is claimed is:

1. An imaging apparatus for a vehicle comprising:
position detection means for detecting a present position of the vehicle;
a plurality of imaging means provided on the vehicle for imaging external circumstances surrounding the vehicle in different directions;
memory means for storing a table that relates each imaging position of a plurality of fixed imaging positions where imaging is scheduled and at least one of a plurality of imaging means specified to be used at the imaging position among the plurality of imaging means;
imaging control means which, when the position detected by the position detection means reaches close to the imaging position, causes the imaging means to image external circumstances of the vehicle, the imaging means being a part of the plurality of imaging means specified in the memory means as ones to be used at the imaging position among the plurality of imaging means; and
display means for displaying images of the external circumstances imaged by the imaging means.

2. The imaging apparatus according to claim 1, wherein the plurality of imaging means include five imaging cameras for imaging front right, front left, rear, rear right and rear left of the vehicle.

3. The imaging apparatus according to claim 1, wherein:
the memory means stores imaging conditions at the imaging position; and
the imaging control means causes the imaging means to effect the imaging at the imaging position on condition that the imaging conditions are satisfied.

4. The imaging apparatus according to claim 3, wherein
at least any one of a vehicle speed, traveling direction and a shift position of a vehicle transmission is specified as the imaging condition for each imaging position, and wherein
the imaging control means causes the imaging means to perform the imaging at the imaging position only when the stored imaging condition is satisfied at the imaging position.

5. The imaging apparatus according to claim 1, further comprising:
at least one of map data obtaining means and communication means, wherein
the imaging control means causes the imaging means to effect the imaging based on the data related to a dangerous zone obtained through the map data obtaining means or the communication means.

6. The imaging apparatus according to claim 3, further comprising:
registration operation means for selecting the imaging position where the imaging is scheduled and the imaging means to be used, wherein
when the registration operation means is operated, the present position detected by the position detection means is stored in the memory means as the imaging position and
a selected imaging means is stored in the memory means as the imaging means to be used at the imaging position, and
at least any one of a vehicle speed, a traveling direction and a shift position of a vehicle transmission at the time of operation of the registration operation means, is stored as imaging condition in the memory means.

7. The imaging apparatus according to claim 1, farther comprising:
communication means capable of communicating with an information center having data related to an imaging recommendation point; and
object specifying means for setting a registration object including at least one of a route up to a destination and an area; wherein
when the registration object is set by the object specifying means, the communication means communicates with the information center to download the imaging recommendation point in the registration object, and stores the imaging recommendation point in the memory means as the imaging position.

8. The imaging apparatus according to claim 1, farther comprising:
imaging recommendation point storage medium having data related to an image recommendation point; and
object specifying means for setting a registration object including at least one of a route up to a destination and an area; wherein
when the registration object is set, the imaging recommendation point is downloaded from the imaging recommendation point storage medium, and
the imaging recommendation point is stored in the memory means as the imaging position.

9. The imaging apparatus according to claim 1, farther comprising:
distance measuring means for measuring a distance from the vehicle to an obstacle existing by the road; and
registration operation means; wherein
when the distance to the obstacle by the road is detected by the distance measuring means to be smaller than a predetermined value, the registration operation means is operated to store a detected point in the memory means as the imaging position.

10. The imaging apparatus according to claim 3, further comprising:
a speed sensor for detecting a travel speed of the vehicle, wherein
the memory means further stores a predetermined vehicle speed as the imaging condition in correspondence to each imaging position, and wherein
the imaging control means causes the imaging means to effect the imaging near the imaging position on condition that the travel speed detected by the speed sensor near the imaging position is the predetermined vehicle speed specified in correspondence to the imaging position.

11. The imaging apparatus according to claim 3, further comprising:
a gyroscope for detecting a travel direction of the vehicle, wherein
the memory means further stores a predetermined travel direction as the imaging condition in correspondence to each imaging position, and wherein
the imaging control means causes the imaging means to effect the imaging near the imaging position on condition that the travel direction detected by the gyroscope near the imaging position is the predetermined travel direction specified in correspondence to the imaging position.

12. The imaging apparatus according to claim 3, further comprising:
a shift position sensor for detecting a shift position of a transmission of the vehicle, wherein
the memory means further stores a shift position as the imaging condition in correspondence to each imaging position, and wherein
the imaging control means causes the imaging means to effect the imaging near the imaging position on condition that the shift position detected by the shift position sensor near the imaging position is the predetermined shift position specified in correspondence to the imaging position.

13. The imaging apparatus according to claim 1, wherein
the table of the memory means relates at least one of the plurality of imaging positions to at least two imaging means, and wherein
the display means displays, by dividing a display screen thereof, at least two images imaged by the at least two imaging means near the at least one of the plurality of imaging positions.

14. The imaging apparatus according to claim 1, wherein:
the imaging control means is configured to
determine if a detected present position corresponds to one of the plurality of fixed imaging positions stored in the memory means,
determine at least one of a plurality of imaging means to be used at a determined fixed imaging position by referring to the table of the memory means when the detected present position corresponds to the determined fixed imaging position, and
cause only the determined imaging means to image the external circumstances at the detected present position.

15. An imaging apparatus for a vehicle comprising:
position detection means for detecting a present position of the vehicle;
a plurality of imaging means provided on the vehicle for imaging in different directions external circumstances surrounding the vehicle over wide ranges;
memory means for storing a table that relates each imaging position of a plurality of fixed imaging positions where the imaging is scheduled to at least one of the plurality of imaging means specified to be used at the imaging position, and imaging directions at the imaging position;
imaging control means which, when the present position detected by the position detection means reaches close to the imaging position, causes the imaging means to image the external circumstances of the vehicle, the imaging means being a part of the plurality of imagining means specified in the memory means as ones to effect imaging in the imaging directions at the imaging position where the imaging is scheduled among the plurality of imaging means; and
display means for displaying images of the external circumstances imaged in the imaging directions stored in the memory means.

16. The imaging apparatus according to claim 15, wherein:
the memory means stores imaging conditions at the imaging position; and
the imaging control means causes the imaging means to effect the imaging at the imaging position on condition that the imaging conditions are satisfied.

17. The imaging apparatus according to claim 15, wherein
at least any one of a vehicle speed, traveling direction and a shift position of a vehicle transmission is specified as the imaging condition for each imaging position, and wherein
the imaging control means causes the imaging means to perform the imaging at the imaging position only when the stored imaging condition is satisfied at the imaging position.

18. The imaging apparatus according to claim 15, farther comprising:
at least one of map data obtaining means and communication means, wherein
the imaging control means causes the imaging means to effect the imaging based on the data related to a dangerous zone obtained through the map data obtaining means or the communication means.

19. The imaging apparatus according to claim 15, further comprising:
registration operation means for selecting the imaging position where the imaging is scheduled and the imaging means to be used, wherein
when the registration operation means is operated, the present position detected by the position detection means is stored in the memory means as the imaging position and
a selected imaging means is stored in the memory means as the imaging means to be used at the imaging position, and
at least any one of a vehicle speed, a traveling direction and a shift position of a vehicle transmission at the time of operation of the registration operation means, is stored as imaging condition in the memory means.

20. The imaging apparatus according to claim 15, farther comprising:
communication means capable of communicating with an information center having data related to an imaging recommendation point; and
object specifying means for setting a registration object including at least one of a route up to a destination and an area; wherein
when the registration object is set by the object specifying means, the communication means communicates with the information center to download the imaging recommendation point in the registration object, and stores the imaging recommendation point in the memory means as the imaging position.

21. The imaging apparatus according to claim 15, farther comprising:
imaging recommendation point storage medium having data related to an image recommendation point; and
object specifying means for setting a registration object including at least one of a route up to a destination and an area; wherein
when the registration object is set, the imaging recommendation point is downloaded from the imaging recommendation point storage medium, and
the imaging recommendation point is stored in the memory means as the imaging position.

22. The imaging apparatus according to claim 15, further comprising:
distance measuring means for measuring a distance from the vehicle to an obstacle existing by the road; and
registration operation means; wherein
when the distance to the obstacle by the road is detected by the distance measuring means to be smaller than a predetermined value, the registration operation means is operated to store a detected point in the memory means as the imaging position.

23. An imaging apparatus for a vehicle, comprising:
a control circuit coupled to a plurality of cameras disposed on front and rear portions of the vehicle;
a memory coupled to the control circuit, the memory storing instructions for configuring the control circuit;
a display device coupled to the control circuit for displaying images imaged by the plurality of cameras;
a gyroscope coupled to the control circuit for detecting a travel direction of the vehicle;
a shift position sensor coupled to the control circuit for detecting a shift position of a transmission of the vehicle; and
a position detection means coupled to the control circuit for detecting a present position of the vehicle; wherein
the control circuit is configured to:

input data representing a plurality of imaging positions at which imaging is scheduled to be stored in the memory;

input data representing imaging conditions for each of the plurality of imaging positions that must be satisfied before imaging is performed at the plurality of imaging positions in the memory, wherein the imaging conditions include a travel direction of the vehicle, a shift position of a transmission of the vehicle, and a present position of the vehicle;

input data indicating a particular one of the plurality of cameras for performing the imaging at the each of the plurality of imaging positions; and control the particular one of the plurality of cameras to perform the imaging at one or more of the plurality of imaging positions when the imaging conditions for each of the one or more of the plurality of imaging positions are satisfied.

* * * * *